May 18, 1926.
H. A. KENNEDY
1,585,251
GAME APPARATUS
Filed Nov. 14, 1923    4 Sheets-Sheet 1
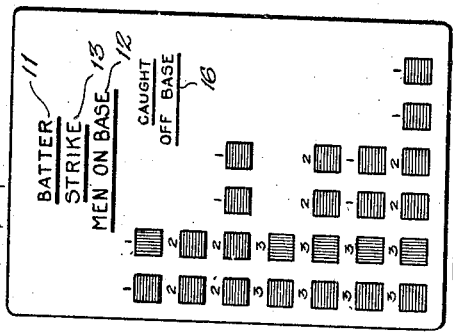
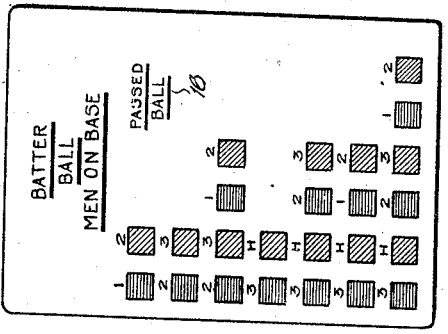
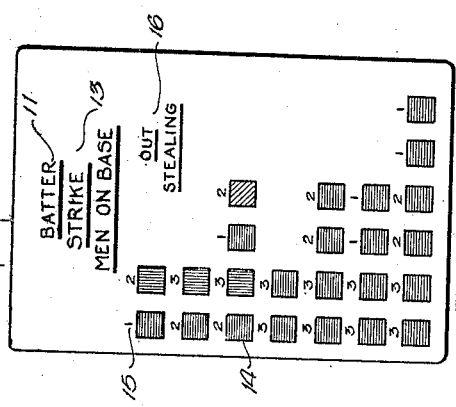
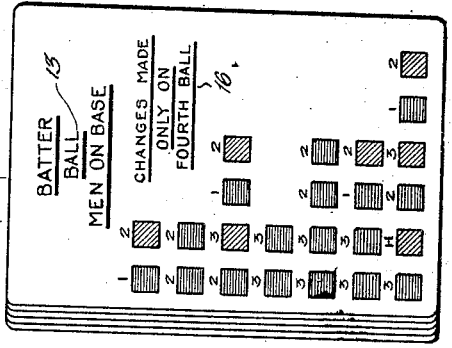
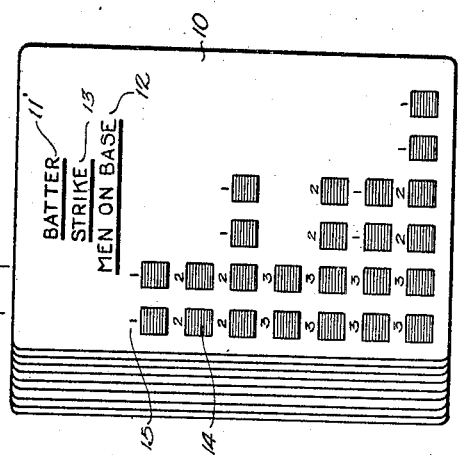
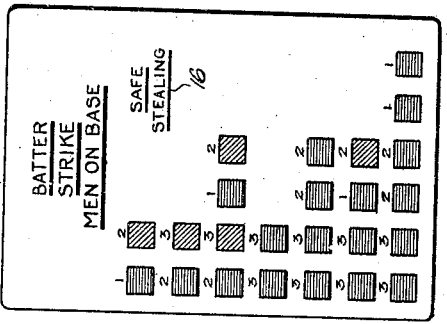
WITNESSES
INVENTOR
HENRY A. KENNEDY
BY
ATTORNEYS May 18, 1926.
H. A. KENNEDY
1,585,251
GAME APPARATUS
Filed Nov. 14, 1923  4 Sheets-Sheet 2
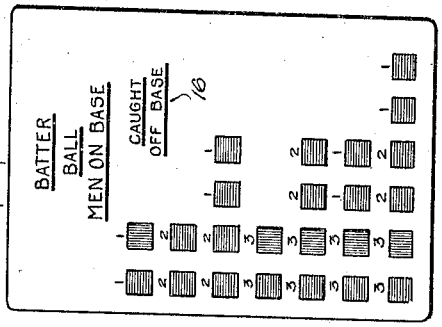
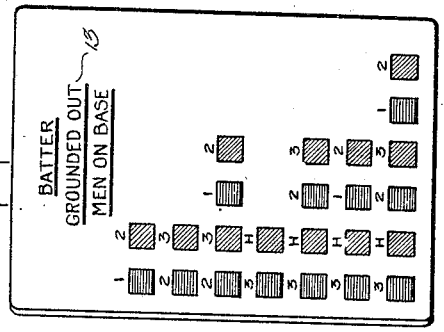
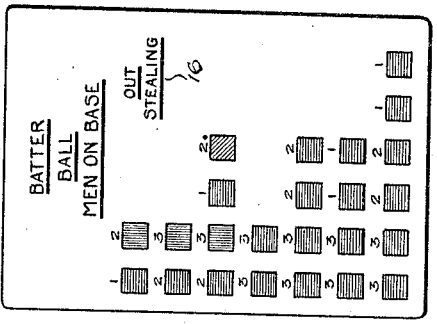
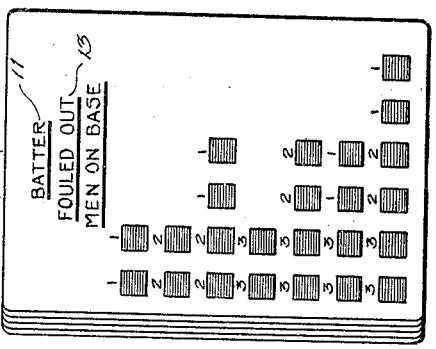
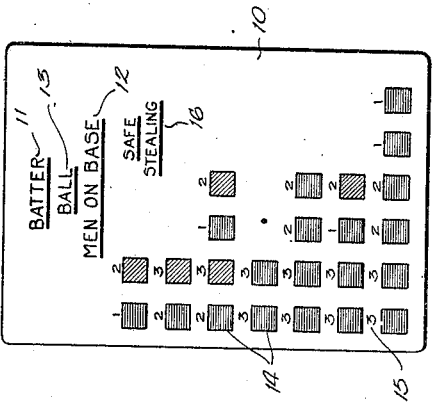
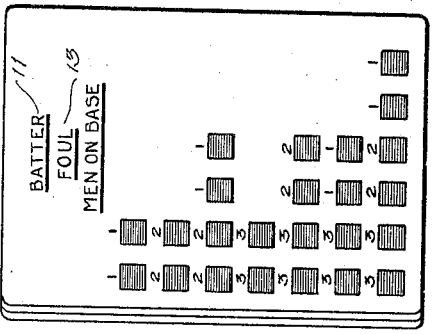
WITNESSES
INVENTOR
HENRY A. KENNEDY
BY
ATTORNEYS May 18, 1926.
H. A. KENNEDY
1,585,251
GAME APPARATUS
Filed Nov. 14, 1923   4 Sheets-Sheet 3
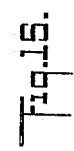
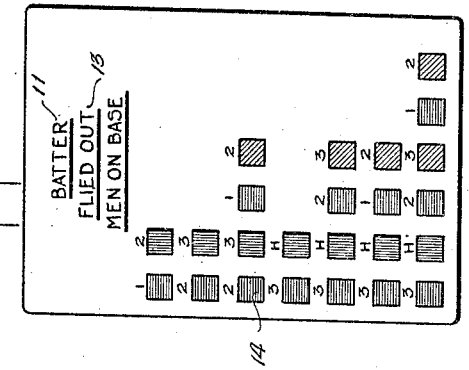
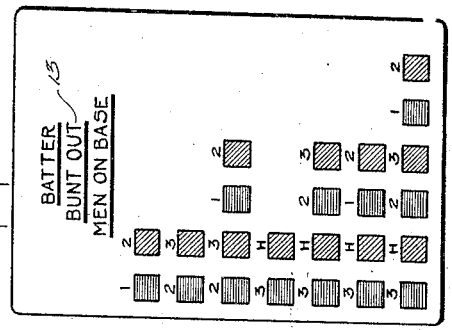
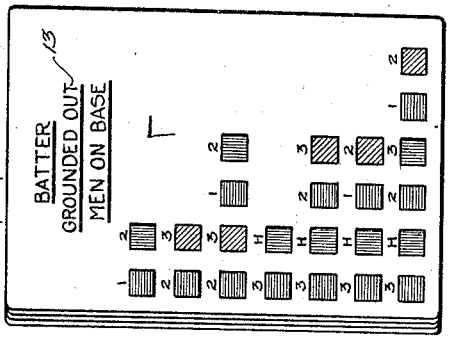
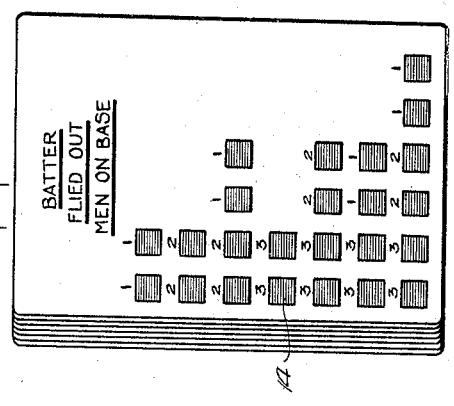
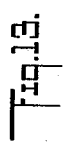
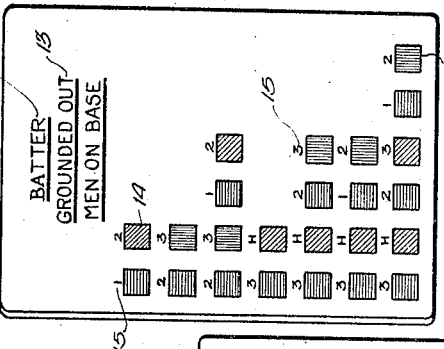
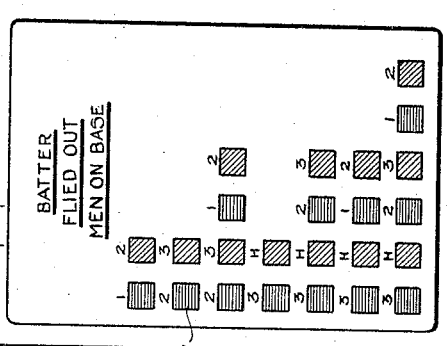
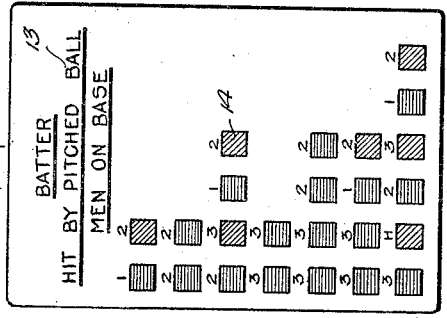
WITNESSES
INVENTOR
HENRY A. KENNEDY
BY
ATTORNEYS May 18, 1926.
H. A. KENNEDY
1,585,251
GAME APPARATUS
Filed Nov. 14, 1923    4 Sheets-Sheet 4
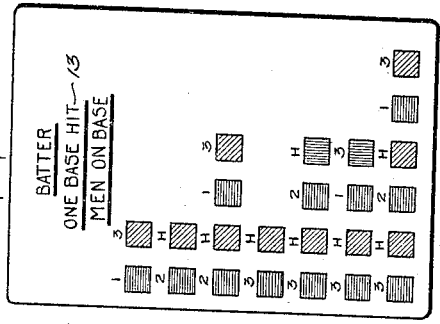
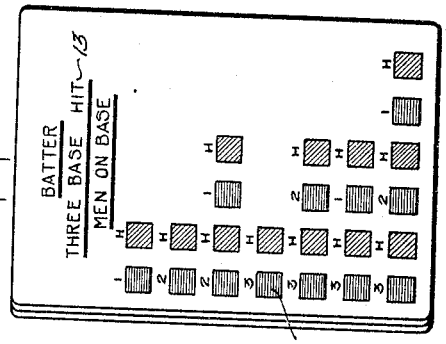
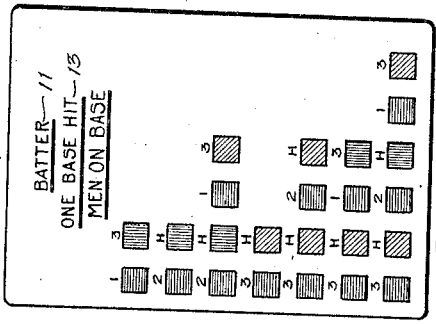
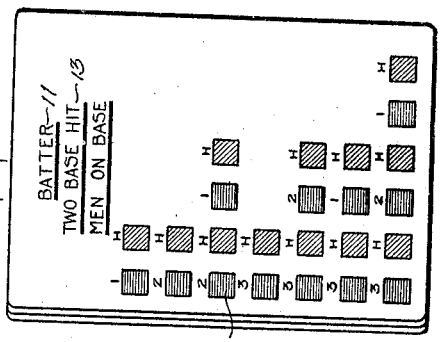
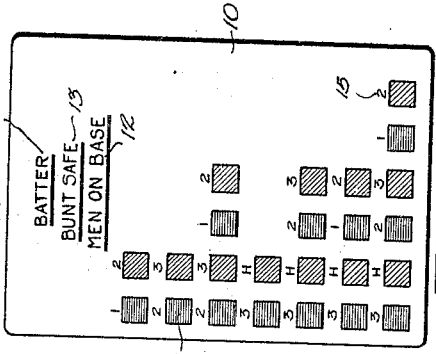
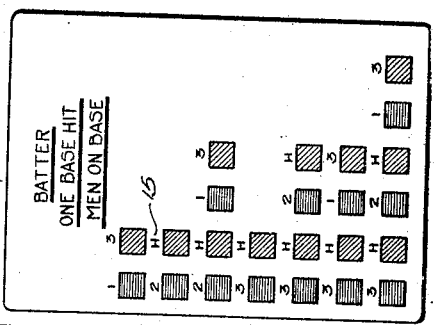
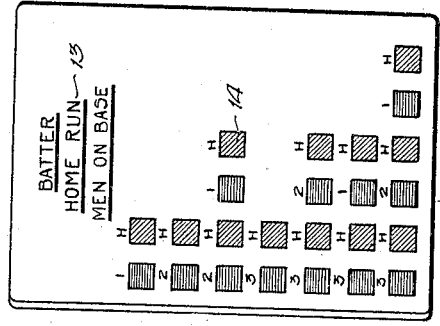
INVENTOR
HENRY A. KENNEDY
BY
ATTORNEYS Patented May 18, 1926.

1,585,251

UNITED STATES PATENT OFFICE.

HENRY A. KENNEDY, OF NEW YORK, N. Y.

GAME APPARATUS.

Application filed November 14, 1923. Serial No. 674,732.

This invention has relation to a game apparatus and has particular reference to a card game which is designed to simulate outdoor games such as baseball, football, or other analogous sports.

One of the principal objects of the present invention, is to provide a game which in addition to being highly amusing and interesting to the participants, constitutes a medium for the instruction or schooling of the participants in the various rules and features of the game which it simulates.

As a further object the invention contemplates a game in which provision is made for the introduction of the usual and unusual plays in the proper and corresponding manner in which they ordinarily occur on the playing field of the game of which the present apparatus serves as a means of simulation.

More specifically the invention contemplates a card game which consists of a deck of cards adapted to be shuffled and from which the cards are drawn face down, said cards being provided with suitable indicia and symbols thereon relative to the game which it simulates and in which the symbols or indicia of succeeding cards modify the effect of the preceding cards in the scoring of the game.

As a further object the invention aims to produce a game apparatus which is of a comparatively simple nature, inexpensive to manufacture, and which offers a wide variety of results in the playing of the game.

With the above recited and other objects in view, the invention resides in a game apparatus which is more particularly set forth in the following specification, particularly pointed out in the appended claim and illustrated in the accompanying drawings, it being understood that variations and modifications which properly fall within the scope of the appended claim may be resorted to when found expedient.

In the drawings—

Figures 1 to 26 illustrate face views of the various cards making up the deck by means of which the game is played.

Referring to the drawings by characters of reference, 10 designates respectively the various cards of the deck, each of which is provided with a back either blank or provided with the same design as the other cards, and each of which is provided with a face upon which is printed or otherwise inscribed suitable indicia and symbols relating to the game of which the apparatus affords a medium of simulation. In view of the fact that the showing relates to the game of baseball, which is merely illustrative of one of the many games which may be simulated, the following specification will be confined to the terms used in this game and the rules of scoring as laid down for the standard game of baseball. The indicia on each card is classified under two headings, namely, "Batter" indicated at 11, and "Men on base" indicated at 12. Under the legend "Batter" suitable indicia 13 is inscribed to indicate the action of the batter, while under the legend "Men on base" suitable symbols 14 are provided which indicate the movement of the men on the bases. The symbols may take the form of blocks or squares of different colors as illustrated, or various geometric figures, letters or any other symbols which may be properly employed to carry out the general scheme of the game apparatus. In the present instance the colored blocks or squares are illustrated as the preferred form and the same are arranged in a plurality of transverse rows on the face of each card under the heading "Men on base." It may here be stated that no attention is directed to the symbols under the heading "Men on base" until a previous card or cards have been drawn from the deck to place a man on base.

The indicia under the heading "Batter" illustrated on all of the cards in Figs. 1 to 4 inclusive indicates a strike on the batter. On the face of all of the cards in Fig. 1 of which there are nine exactly alike, all of the squares or blocks are blue which indicates that no change has been made in the position of players occupying the bases and that therefore any men occupying the bases are safe due to the fact that none have advanced from their original position when any of the said cards are drawn. It will be further noted that suitable characters 15 are superposed with respect to each block or square which respectively indicate the number of the "base." In the uppermost row of each card, the left hand block or square indicates the base occupied and the right hand square the base tried for or secured by the runner. Reading downward the left hand block or square of each pair in each row indicates the base occupied by the runner and the base tried for or secured by the runner. If the right hand block of each pair in each row is red it indicates that the man in an attempt to advance to the next base was caught and is out. If the right hand of each pair in the row is green it indicates that the man is safe and therefore has advanced to the base indicated by the character or numeral superimposed thereover.

In the single card illustrated in Fig. 2 it will be noted that the right hand block is red which implies that the man occupying first base in an attempt to advance to second base was caught. It will be further noted that on this card under the heading "Men on base" there is inscribed suitable indicia 16 which indicates that the man was "out stealing". Likewise on this card in the second row the right hand block or square is red which indicates that a man on second in an attempt to steal third was caught and is "out stealing". On each card there are seven transverse rows of blocks, the upper row being taken into consideration only when first base is occupied. The next row reading downward is taken into consideration only when second base is occupied. The third row reading downward is taken into consideration only when first and second bases are occupied. The fourth row reading downward is taken into consideration only when third base is occupied. The fifth row reading downward is taken into consideration only when second and third base is occupied. The sixth row reading downward is only taken into consideration when first and third bases are occupied and the bottom row is only observed when there are men on first, second and third base.

In the card illustrated in Fig. 3 the indicia 16 under the heading "Men on base" indicates that a man occupying one of the bases was caught off "base" and therefore out.

In the card illustrated in Fig. 4 the indicia 16 under the heading "Men on base" indicates that a man attempting to steal a base was "safe stealing" and therefore advanced to the next base indicated by the symbols 14.

On the cards indicated in Figs. 5 to 9 inclusive it will be noted that the indicia 13 under the heading "Batter" indicates a "ball".

In Fig. 5 the indicia 16 under the heading "Men on base" on each of the first cards in this instance informs the players of the game that changes are made only on the fourth ball in accordance with the symbols.

In Fig. 6 the indicia 16 under the heading "Men on base" indicates a "passed ball" in which event the changes in the position of the men on base is made in accordance with the symbols.

In Fig. 7 the indicia 16 under the heading "Men on base" reads "safe stealing" which indicates that the men occupying the various bases are safe at the base indicated by the symbols whereas in Fig. 8 the indicia 16 reads "out stealing" and the indicia 16 in Fig. 9 reads "caught off base", the changes being accordingly made in conformity to the symbols and the position of the men on bases.

In Fig. 10 three cards are illustrated in which the indicia 13 under the heading "Batter" designates a "foul" in which instance no change is made in the men occupying the various bases.

In Fig. 11 the indicia 13 under the heading "Batter" designates "fouled out" which also leaves the men on bases according to the symbols in the same relative position. There are five of these cards which are identically the same.

In Figs. 12, 13 and 14 the indicia 13 under the heading "Batter" reads "grounded out" which indicates that the man at the bat was put out on the ground ball and changes in the men on base are correspondingly made in accordance with the symbols 14. There are two like cards illustrated in Fig. 12, two in Fig. 13 and four in Fig. 14.

In Figs. 15, 16 and 17 the indicia 13 under the heading "Batter" indicates that the batter "flied out" and the changes in the position of the men on base is made according to the symbols 14. In this instance there is one card shown in Fig. 15, one card shown in Fig. 16 and seven cards shown in Fig. 17 in which the symbols are identical.

In Fig. 18 there is a single card in which the indicia 13 under the heading "Batter" indicates "bunt out" which designates that the batter bunted and was out while the changes of the position of the men on base is made according to the symbols.

In Fig. 19 the indicia 13 under the heading "Batter" indicates "bunt safe" which means that the batter bunted safe and the changes of the men on base were made according to the symbols 14. In this instance there is a single card for this purpose.

In Figs. 20, 21 and 22 the indicia 13 under the heading "Batter" indicates a "one base hit," in which instance the changes are made according to the symbols. It will be noted that a single card in each of these figures is employed for the purpose.

In Fig. 23 three cards are indicated which are the same and in which the indicia 13 under the heading "Batter" indicates a "two base hit," in which instance the changes of the position of the men on base is made in accordance with the symbols 14.

In Fig. 24 three cards are illustrated which are exactly the same and in which the indicia 13 indicates a "three base hit," the symbols 14 regulating the changes to be made in the position of the men on base.

In Fig. 25 two cards are illustrated which are the same in which the indicia 13 under the heading "Batter" indicates a "home run" and in which the symbols 14 of the "Men on base" control the changes of the position or advancement of the runners.

In Fig. 26 in which a single card is shown the indicia 13 under the heading "Batter" reads "hit by pitched ball" which means that the batter takes his base and that the runners advanced according to the symbols 14.

To illustrate the method of play, the cards are shuffled and the deck or pack is laid face down, preferably two players participating in the game, and after it has been determined which of the players has the first draw, the player who wins the decision, draws the uppermost card from the pack laying the same face up. The indicia 13 under the heading "Batter" is read, no regard being paid on the first draw to the symbols or indicia under the heading "Men on base." The player continues to draw the uppermost card from the pack until three men are out. After a card is drawn which places a man on base, the symbols and indicia under the heading "Men on base" of the next card drawn is observed for the purpose of determining the movement of the men on base. For example, assuming that the next card drawn is that illustrated in Fig. 22 which indicates a "one base hit," assuming that a man occupied first base only, the upper row would indicate by the right hand block which is green, the man on first base was safe at third, or in other words that the runner advanced safely from first to third base. On the other hand if there was a man only on second base the second row indicates that the runner advanced from second to home safely, as the right hand square of the second row under the character H is green, indicating that the man is safe at home. The third row of this card indicates that the men on second and first base advanced safely respectively to home and third base. The fourth row from the top indicates where a man occupying third base only advanced safely home. The fifth row indicates that men occupying second and third both were safe at home. The sixth row indicates that men on first and third bases respectively advanced to third base and home safely. The bottom row indicates that with the bases full the man on third was safe at home, the man on second was safe at home and the man on first was safe at third. After the first player has drawn cards which indicate that three men are out, the cards which have been drawn by the first player are re-incorporated with the pack which is re-shuffled and the second player proceeds to singly draw the cards from the pack until three are out. The game is scored and divided into innings exactly in the manner and following the rules of the standard game of baseball. It will be noted that the cards are divided into sets whereby the usual and unusual plays are properly proportioned so that the scores of the games will closely following the score of the game which it simulates.

From the foregoing it will be seen that a simple and inexpensive form of game apparatus has been provided which will afford in addition to a highly amusing and attractive entertainment to the participants, a medium for instructing or schooling the players in the game which it simulates.

I claim:

A base ball card game comprising a deck of cards, each card having indicia thereon denoting the action of the batter and also having indicia therein denoting the action of the men on base, the indicia denoting the action of the men on base consisting of transverse rows of symbols, each row of symbols corresponding to a possible situation on the bases, each row of symbols consisting of a number of pairs of symbols, one member of each pair of symbols denoting the initial position of the runner on the base in the possible situation denoted by the pair of symbols, the other member of each pair of symbols positively denoting the resulting disposition of the runner following the action of the batter denoted on the card.

HENRY A. KENNEDY.